Oct. 16, 1945.   C. W. BECK ET AL   2,386,925
PLATE REVERSING MECHANISM
Filed April 8, 1943
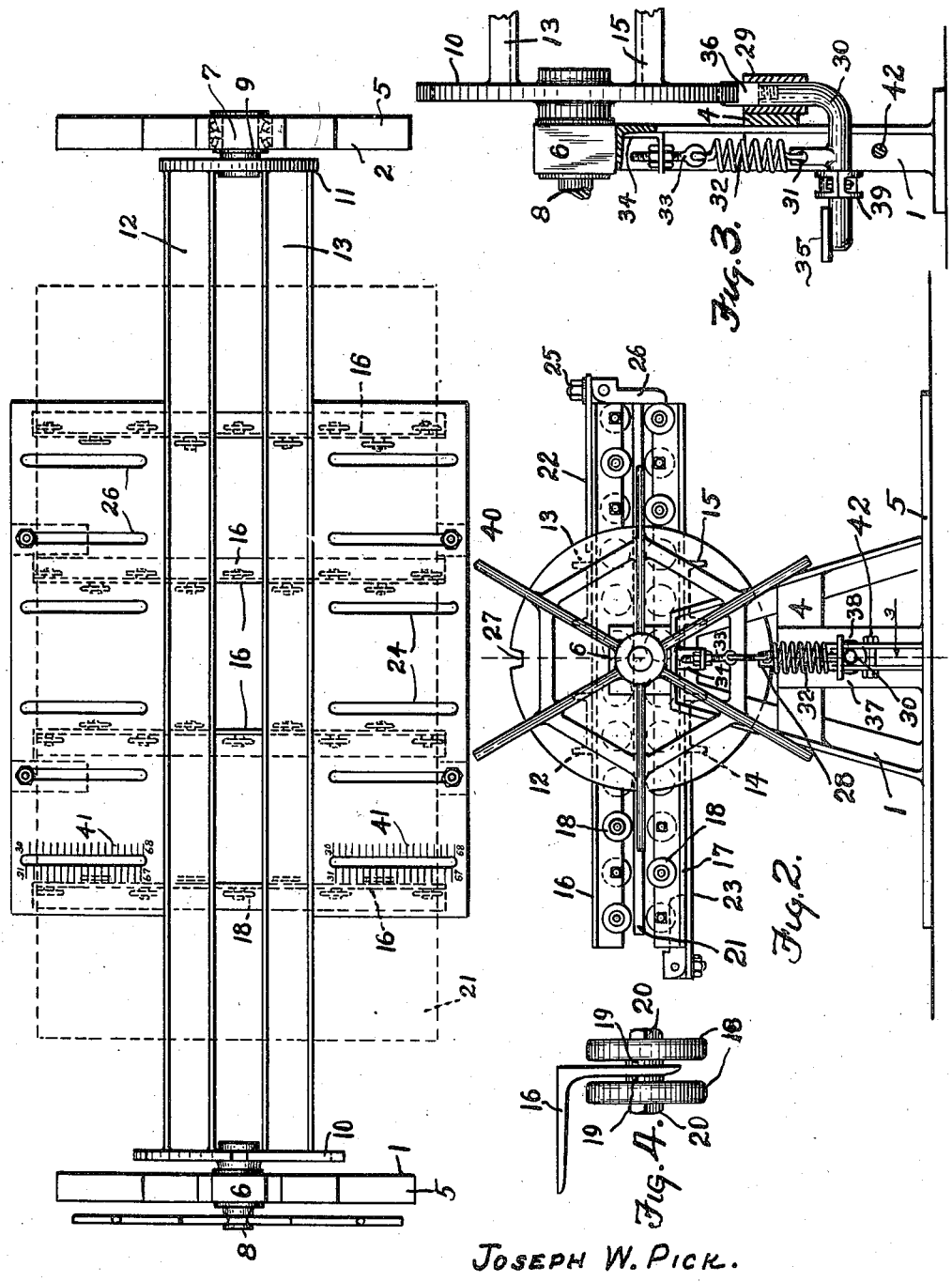
Joseph W. Pick.
Charles W. Beck. INVENTORS
BY Allen & Allen
Attorneys.

Patented Oct. 16, 1945

2,386,925

UNITED STATES PATENT OFFICE 2,386,925

PLATE REVERSING MECHANISM

Charles W. Beck and Joseph W. Pick, Middletown, Ohio, assignors to The American Rolling Mill Company, Middletown, Ohio, a corporation of Ohio Application April 8, 1943, Serial No. 482,330

6 Claims. (Cl. 214—1)

In a specific aspect our invention has to do with problems in the handling and inspection of heavy metal plates, such for example, as armor plate. It will however be apparent that our apparatus, hereinafter described in an exemplary embodiment, is not thus confined in its field of utility but is applicable to a wide range of industrial usage involving similar problems of reversing plates or heavy sheet-like forms.

In the inspection of armor plate, the finished plates may be delivered successively to an inspection table in the form of a conveyor or roller table. But since inspection is required on both sides of the plate, there is the necessity of turning each plate over with the assistance of plate lifters or the like and redelivering it to the same or to different inspection tables. The plates are in general too heavy to be turned over by hand even with many men to do the turning. With lighter sheet metal hand turning may be accomplished but it is unnecessarily laborious, costly and inconvenient. Whether the sheet or plate material be handled manually or by lifting equipment, there is always danger of scratching and marring its surfaces and in some instances of impairing the configuration of its edges.

An object of our invention is to provide a simple apparatus by which plate or sheet material may readily be turned upside down.

An object of our invention is to provide a mechanism for the purpose set forth which, in its extent in the direction of an inspection table or the like, is scarcely wider than a single sheet or plate to be turned, so that the mechanism may be interposed between, say, two inspection tables with the consumption of very little floor space.

It is an object of our invention to provide a mechanism which requires very little power in its operation and in which very heavy plates may readily be turned or reversed by one man. In more elaborate forms of the mechanism the aspect of general balance and low power consumption permit us to employ a very small motor for the turning operation.

It is an object of our invention to provide a plate reversing mechanism which is automatic in its action of receiving the plate for reversal and of delivering it after it has been reversed.

These and other objects of our invention which will be set forth hereinafter or will be apparent to one skilled in the art upon reading these specifications, we accomplish by that certain construction and arrangement of parts of which we shall now describe an exemplary embodiment.

Reference is made to the drawing which forms a part hereof and in which:

Figure 1 is a plan view of an exemplary form of our mechanism.

Figure 2 is an end elevation thereof.

Figure 3 is a partial section taken through an end support along a line indicated at 3 in Figure 2.

Figure 4 is an end elevation of one type of roller mounting.

Briefly in the practice of our invention we provide a mechanism which is mounted for rotation about a horizontal axis. This mechanism comprises, in addition to a suitable framework, upper and lower supports for a plate, these supports being preferably provided with anti-friction means such as rollers. The device is positioned and adapted to receive a plate, delivered to it in any suitable fashion. The plate may proceed along a conveyor or inspection table (not shown) either by gravity or under the tractive effect of driven rollers or the like. Automatic, gravity actuated stop mechanisms retain the plate within the supporting structure both while the supporting structure is substantially horizontal and during the rotation of the structure. These stop mechanisms are preferably adjustable, especially where a range of sizes of plates is to be accommodated, and this adjustability permits us to set them in such manner that the plate, when fully within the supporting structure, will be substantially balanced about the aforesaid horizontal axis. The mechanism may then be rotated, for which suitable mechanical provision is made, as will hereinafter be set forth; and stop means are provided not only to prevent unwanted rotation but to fix the limits of any particular rotative movement. The supporting structure is preferably so controlled as to the limits of its rotative movements that it will lie slightly aslant to the horizontal. Hence the turned plate is delivered by gravity from the supporting structure onto another table or conveyor (not shown).

At each end of the structure we provide a standard 1 and 2. These standards are conveniently made of angle iron cut, bent and welded as shown; but they may have other constructions. When made of angle iron, it is convenient to brace the standards by means of a cross piece 4, thus giving the standards the forms of A-frames. The legs of the standard may be arranged for fastening directly to a floor, but we prefer to fasten them to a base 5 which in turn may be fastened to a suitable foundation or to the floor. Each of the standards has at its top a bearing 6 or 7 to accept shaft portions 8 or 9. To each of these shaft portions there is attached a disk or plate 10 or 11. In the exemplary embodiment four heavy structural members 12, 13, 14 and 15 are attached to the plates as by welding. This provides a main framework which is journaled about the horizontal axis of the shaft portions 8 and 9. The structural members are spaced and arranged in pairs in a fashion which will be clear from Figure 2.

In our exemplary embodiment the plate supporting structure comprises an upper and lower series of cross members 16 and 17. These may conveniently be in the form of angle irons, one leg of each of which is directly welded or otherwise attached to a pair of the structural members 12, 13 or 14, 15. Anti-friction rollers or the like 18 are mounted on each of the cross structural members 16, 17. This may conveniently be done by passing bolts or stub shafts through perforations in the angle iron and welding them thereto, suitable rollers being then journaled on the bolts or stub shafts. The rollers may be staggered as illustrated in Figures 1 and 2, or as shown in Figure 4, the rollers may be arranged in opposed pairs, one roller on each side of a leg of the angle iron, and both journaled on a single bolt which passes through a hole in the angle iron, and is furnished with washers 19 and nuts 20. The spacing of the cross structural members 16 and 17 is such that a sheet or plate of the greatest thickness to be handled can pass between the antifriction rollers or the like thereon. Such a plate is shown in position at 21 in Figures 1 and 2. Where marring of the sheet or plate surfaces requires especial precautions, the rollers 18 may be made of fiber or other non-marring material.

We also weld or otherwise fasten plates or metal sheets 22 and 23 to the cross structural members 16 and 17 as shown. These plates are slotted as at 24 in order to receive brackets for the automatic stop mechanisms hereinafter to be described. These brackets may be short pieces cut from angle iron. The horizontal legs of these pieces may be held to the plates 22 and 23 by bolts 25 passing through the slots 24. Stops 26 are pivoted to the vertical legs of these angle iron pieces. The stops 26 have an arm portion (as shown) of sufficient length to extend fully across the position of the plate 21 between the supports (as will be clear from Figure 2); and the other end of the stops is so configured that the stops can rotate only from a position in which the arm parallels the plate 22 or 23 to a position in which the arm extends at right angles thereto and across the path of a plate 21 within the supports. The arm part of the stops is made the heaviest so that the position of the stops themselves will be determined by gravity. The stops may be made of or faced with fiber or other non-marring material.

The disk 10 is provided with notches 27 and 28. These notches are engaged by a stop device. As shown in Figure 3, we attach a slide bearing 29 to the brace 4 of one of the A-frames. A bent rod or bar 30 is journaled in the bearing 29, as shown. To an ear 31 on the rod 30 we attach a tension spring 32, the other end of which is attached as by an eye bolt 33 to a bracket 34 on the upper part of the A-frame. A foot treadle 35 is welded to an end of the bar 30. A stop member 36 is attached to the other end of the rod 30 and is adapted to enter one of the notches 27, 28 when the bar is in its uppermost position. In order to promote the smooth working of this stop device, we may weld vertical pieces of angle iron 37, 38 between the cross piece 4 and the base 5, and provide the rod 30 with a collar 39 which rides against these angle iron pieces and prevents such cocking of the rod 30 as would tend to bind it in the slide bearing 29. A bolt 42 across the pieces of angle iron 37, 38 may be employed to limit the downward motion of the rod 30.

On the end of the shaft 8 we may fasten a hand wheel or ship's wheel structure 40 where hand operation is desired.

Referring to Figure 2, it may be considered that the plate 21 has entered the device from the left and is resting on the anti-friction rollers 18 on the cross supports 17. The position of the notches 27 and 28 is preferably so chosen that the support structure 16, 17 is not truly horizontal but is slightly tilted with the left hand side in Figure 2 higher than the right hand side. The stops 26 on the right hand side of Figure 2 are actuated by gravity to the position shown, and when the plate 21 passes between the supports 16, 17 it comes to rest by gravity against the stops. The purpose of the adjustability of these stops, which has been described hereinabove, is to enable them to be set so that the center line of gravity of the plate 21 will substantially coincide with the horizontal axis of the mechanism as determined by shafts 8 and 9. The slots may, if desired, be provided with scales or other markings 41 to facilitate adjustment of the stops.

Thus the mechanism can be adjusted for the handling of other batches of plates of different width or dimensions.

To reverse the plate, the operator releases the mechanism by stepping on the treadle 35, and then he turns the mechanism in a clockwise direction as shown in Figure 2 by means of the ship's wheel 40. Before he has rotated the mechanism half a turn, he releases the foot treadle so that it will stop the mechanism in the desired position, which is the reverse of that shown in Figure 2. By reason of the tilt aforesaid the plate, which is now resting by gravity on the cross support 16, will ride out from between supports 16 and 17 by gravity, moving to the right in Figure 2. The stops 26 will not prevent this because those formerly on the high side of the machine will be prevented by the plate 21 from assuming a blocking position until the plate has passed out of the mechanism. Thereupon, of course, they will be actuated by gravity to assume the blocking position shown at the right hand end of Figure 2 in preparation for the reception of the next plate.

Modifications of our exemplary structure may of course be made without departing from the spirit of our invention. Both the rotation and the locking of the mechanism in selected positions may be accomplished by power devices, if desired. Having, however, described our structure in an exemplary embodiment, what we claim as new and desire to secure by Letters Patent is:

1. In a structure of the class described, a rotatable framework, means mounting the framework for rotation, means on the framework to receive a plate or the like between them, and automatic gravity actuated stop means at both ends of the last mentioned means to position a plate or the like with its center line of gravity substantially coincident with the axis of rotation of the mechanism, each such means movable by gravity to a blocking position at the exit side of the device, and to a non-blocking position at the entrance side of the device.

2. In a structure of the class described, a rotatable framework, means mounting the framework for rotation, means on the framework to receive a plate or the like between them, and automatic gravity actuated stop means at each end of the last mentioned means to position a plate or the like with its center line of gravity substantially coincident with the axis of rotation of the mechanism, said stop means each comprising arms having a range of rotative movement of approximately 90° so as to be capable of swinging from a position transverse the path of a plate or the like between the said supports to a position in which they clear said path.

3. In a structure of the class described, a rotatable framework, means mounting the framework for rotation, means on the framework to receive a plate or the like between them, and automatic gravity actuated stop means at each end of the last mentioned means to position a plate or the like with its center line of gravity substantally coincident with the axis of rotation of the mechanism, said stop means each comprising arms having a range of rotative movement of approximately 90° so as to be capable of swinging from a position transverse the path of a plate or the like between the said supports to a position in which they clear said path, said stops being adjustable toward and away from the axis of rotation of said mechanism.

4. The structure claimed in claim 3 including other stop means for fixing the rotative positions of said device in such manner that the supporting structure has two positions, both slightly off horizontal whereby said structure can receive a plate or the like by gravity and deliver it by gravity.

5. In a plate turning device, a pair of standards, a frame extending between said standards and journaled thereon for rotation about a horizontal axis, said frame comprising upper and lower parts, a supporting structure attached to each of said parts, each of said supporting structures comprising cross members provided with anti-frictional supporting means, said supporting portions being adapted to receive a plate or the like between them, and plate-like means attached to said cross members and having slots, gravity actuated stop means attached to said plate-like members and adjustable therealong in said slots, means for rotating the frame and means for fixing the frame in alternative substantially horizontal positions, said last mentioned means comprising a disk at the end of said frame, opposed notches in said disk and abutment means adapted to enter said notches for the purpose described.

6. In a plate turning device, a pair of standards, a frame extending between said standards and journaled thereon for rotation about a horizontal axis, said frame comprising upper and lower parts, a supporting structure attached to each of said parts, each of said supporting structures comprising cross members provided with anti-frictional supporting means, said supporting portions being adapted to receive a plate or the like between them, and plate-like means attached to said cross members and having slots, gravity actuated stop means attached to said plate-like members and adjustable therealong in said slots, means for rotating the frame and means for fixing the frame in alternative substantally horizontal positions, said last mentioned means comprising a disk at the end of said frame, opposed notches in said disk and abutment means adapted to enter said notches for the purpose described, said stop means comprising elongated members adapted in one position to lie across the plane of a plate or the like between said supports and in another position to clear said plane.

CHARLES W. BECK.
JOSEPH W. PICK.